Aug. 16, 1966 R. E. BLIGHT 3,267,352

HARMONIC GENERATORS UTILIZING A BASIC MULTIPLYING ELEMENT RESONANT AT BOTH THE INPUT AND OUTPUT FREQUENCIES

Filed Jan. 23, 1964

INVENTOR
RONALD E. BLIGHT

BY Ronald Brown
ATTORNEY

United States Patent Office 3,267,352
Patented August 16, 1966

3,267,352

HARMONIC GENERATORS UTILIZING A BASIC MULTIPLYING ELEMENT RESONANT AT BOTH THE INPUT AND OUTPUT FREQUENCIES

Ronald E. Blight, Framingham, Mass., assignor to Raytheon Company, Lexington, Ohio, a corporation of Delaware Filed Jan. 23, 1964, Ser. No. 339,708
7 Claims. (Cl. 321—69)

This invention relates to harmonic generators for deriving from an input electrical oscillation an electrical oscillation which is a multiple of the frequency of the input oscillation.

Harconic generators are useful in many applications in systems work. The need for such devices exists in the microwave region in the same fashion as in the lower frequency communications, locating and signaling systems in which these devices are currently employed. Often, apart from the need for generating higher frequencies, it is possible to employ a harmonic generator in place of an independent oscillating generator. Many such generators, such as vacuum tubes, or klystrons are subject to instability or deteriorate with age, or require extra equipment to remain precisely tuned. Additionally, these tube devices are generally extremely expensive. Furthermore, harmonic generators can also be used in conjunction with highly stable crystal control oscillators to provide highly stable microwave frequencies.

The successful generation of oscillatory signals in the microwave region becomes increasingly complicated as the frequency to be generated increases. The various means heretofore used for generating these frequencies, such as tubes and other oscillating generators, tended to be unstable or inaccurate in the higher reaches of the kilomegacycle region. When it is nevertheless desired to develop frequencies of this order, the most practical means is often the use of some harmonic frequency generating arrangement.

In the past, frequency doubling arrangements, utilizing ferromagnetic elements within a resonant cavity, have been utilized. While the devices of this construction have proved successful, the structure tends to operate at very low efficiencies and, accordingly, the output signal is of a very low magnitude.

Accordingly, it is an object of the present invention to provide an improved harmonic frequency generator.

Another object of this invention is to provide a microwave frequency harmonic generator using a basic multiplying element resonant at both input and output frequencies.

A further object of this invention is to provide a strip transmission line harmonic generator.

It is an additional object of this invention to provide a harmonic generator using cascaded multiplying elements to form an array to couple energy in progressive frequency steps over a broad band of frequencies.

In accordance with this invention, a harmonic generator for providing a signal which is a multiple of the frequency of another signal includes a resonant multiplying element having a portion thereof which is resonant at a first frequency and a portion thereof which is resonant at a second frequency and means for mutually coupling said frequencies to and from said element. The basic element in the preferred embodiment comprises a short-circuited distributed transmission line utilizing a lumped reactance, such as a capacitance, to provide an effective distributed one-quarter wavelength resonant transmission line at both frequencies. Additionally, this invention utilizes the basic resonant element in a cascaded chain to form an interdigital array of similar multiplying elements to mutually couple energy in progressive frequency steps to a utilization device.

For a better understanding of the present invention, together with other and further objectives thereof, reference is had to the following description taken in connection with the accompanying drawing wherein.

Figures 1, 2, 3, 4:
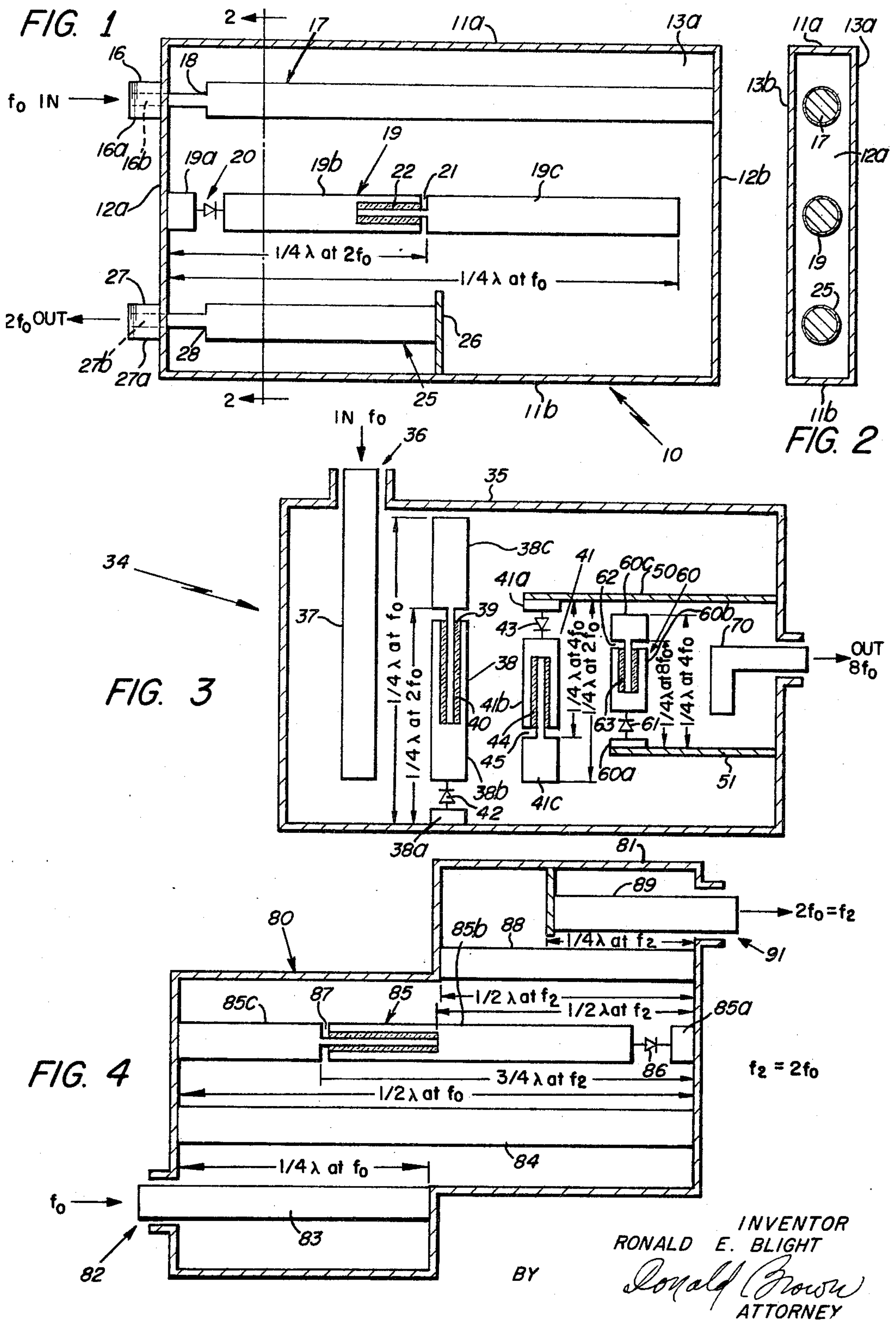
FIG. 1 is a top plan view of a strip transmission line doubler with the top ground plane plate removed and utilizing single shorted resonant elements.
FIG. 2 is a section along line 2—2 of FIG. 1.
FIG. 3 is a top plan view of a cascaded strip line harmonic generator having the top ground plane plate removed.
FIG. 4 is a top plan view of a strip transmission line doubler with the top ground plane removed utilizing double shorted resonant elements.

Referring particularly to FIGS. 1 and 2, there is shown a harmonic doubler 10 comprised of a rectangular structure formed by two side plates 11*a* and 11*b*, two end plates 12*a* and 12*b* and two cover plates 13*b* and 13*a*. This structure forms the ground planes of a strip transmission line. Mounted within this rectangular structure is a probe 17 for mutually coupling input energy at a frequency $f_0$ to the basic multiplying element 19 which will be discussed hereinafter. Energy is provided to said element via the probe 17 by a coaxial coupler 16 having an outside conducting surface 16*a* and a center conductor 16*b*. The center conductor 16*b* is directly coupled by way of an impedance transition 18 to the probe 17. The probe 17, which forms the center conductor of the strip transmission line structure, is connected to plate 12*b* as shown in FIG. 1. The probe or coupling structure 17 could comprise brass covered with a silver layer. The probe 17 has a lengthwise dimension such that it is effectively one-quarter of a wavelength at the input frequency of interest in order to provide optimum inductive or mutually distributed coupling to the basic multiplying element.

Mounted within the rectangular structure formed by the plates is the basic multiplying element 19. The element comprises conductor sections 19*a*, 19*b* and 19*c*. Mounted between section 19*a* and section 19*b* is a nonlinear reactance such as, for example, a nonlinear capacitance. This nonlinear capacitance is preferably a varactor diode or tunnel diode. Between sections 19*b* and 19*c* a high impedance device such as a choke or anti-resonant circuit is used. The element 19, being provided with a lumped reactance, is formed so as to act as a resonant one-quarter wavelength structure at the input frequency of $f_0$ between its shorted end 19*a* and its open end 19*c*. Additionally, sections 19*a* and 19*b*, in conjunction with the varactor diode 20, act to provide an effective distributed transmission line which is resonant at one-quarter wavelength at $2f_0$ where $f_0$ is the input frequency. The choke 21 at the end of section 19*b* acts as a high impedance to prevent the signal $2f_0$ from traveling the length of the element 19, thus permitting coupling of the output frequency to a second probe 25, which will be discussed below.

The element 19 is shorted at 19*a* end to the plate 12*a* and is open circuited at its other end. In order to reduce the physical dimensions of the choke 21, a dielectric material 122, such as Teflon is utilized, thus permitting a high impedance structure to be formed over a single dimension of section 19*b*. The spacing between the probe 17 and the element 19 is adjusted to provide for optimum mutual coupling. It is to be noted that in order to obtain proper phasing so as to obtain maximum mutual coupling between probe 17 and element 19, the high impedance end of probe 17 that is the closest to plate 12*a* is aligned with the low impedance or shorted end of element 19 which is connected to plate 12*a*.

To couple an output signal from the basic element 10 at a frequency of $2f_0$, an output probe 25 is utilized. The output probe 25 is coupled to one end of the extension of the ground plane 26 and at its other end is coupled through a transition 28 to an output coaxial coupler 27 having an inner conductor **27*b* and an outer conductor 27*a*. The probe 25 is connected such that it exhibits one-quarter wavelength at the frequency $2f_0$ in order to provide optimum mutual coupling of the desired doubled frequency. The spacing between the probe 25 and the element 19 is also adjusted physically in order to provide maximum coupling. The probe 25 can be constructed of the same material as noted with regard to probe 17. Furthermore, the element 19** can also be constructed of brass covered with a silver coating. The plates previously mentioned, which make up the reactance structure, are also constructed of brass. Thus, there is described a configuration of a harmonic generator which is capable of doubling an input signal frequency. The doubler of this invention has been obtained utilizing a basic element which is resonant at two distinct frequencies, one of which is an integral multiple of the other, and which is coupled to an input circuit and an output circuit utilizing mutual distributed inductive coupling.

A frequency doubling arrangement, constructed in accordance with this invention, successfully converts 200 mw. of energy at 1,300 megacycles into a double frequency output of 100 mw. at 2,600 megacycles. For this frequency, the cavity has an approximate height of about three-quarters of an inch, a front to back dimension of about two and one-half inches and a side to side dimension of about two inches. The probe 17 is approximately two and one-half inches long with a diameter of about one-quarter of an inch. The element 19, due to the lumped capacitance 21, is slightly less than two and one-half inches long and also has a diameter of one-quarter of an inch. The probe 25 has a length of approximately one and one-quarter inches with a diameter of about one-quarter of an inch. The probes and the conducting element 19 are spaced approximately one-half of an inch from side to side. It is to be further noted that the varactor diode 20 can be D.C. biased as, for example, by direct coupling a D.C. source to one end of the element 19 to alter the operating characteristics of the diode. Those skilled in the art, however, will appreciate that other dimensions for the structure of FIGS. 1 and 2 could be utilized for different frequency ranges and, additionally, diode biasing levels can be adjusted in accordance with the operating characteristics of the particular varactor diode utilized.

Referring now to FIG. 3, there is disclosed a top plan view of a cascaded strip line harmonic generator 34 having the top ground plane removed. Energy is coupled into the strip line structure by way of a probe 37 which acts as a low pass filter at the input signal frequency $f_0$. Adjacent and parallel to the probe 37 is a resonant transmission line element 38 having center conductor sections **38*a*, 38*b* and 38*c*. Coupled to this conductor in the same manner as described with relation to FIG. 1 is a non-linear lumped reactance such as a varactor 42 and an anti-resonant circuit or choke 39. Section 38*a* of the center conductor 38 is connected to the outer shell or ground plane 35 of the strip transmission line structure 34. The element 38 has its entire length resonant at the input frequency $f_0$ and has a portion of its length comprising center conductor section 38*a*, varactor 42, section 38*b* and choke 39** resonant at a frequency of $2f_0$.

Positioned adjacent to and parallel to resonant element 38 is a second resonant element 41 comprised of center conductor elements **41*a*, 41*b* and 41*c*. Conductor sections 41*a* and 41*b* have a varactor 43 coupled therebetween and a choke 45 is positioned between sections 41*b* and 41*c*. Conductor section 41*a* is connected to a ground plane 50 which is itself connected to the outer shell 35 of the strip transmission line structure 34. The entire length of the element 41 is equal to one-quarter wavelength at $2f_0$ and, accordingly, acts as a resonant structure at that frequency. Energy is mutually or inductively coupled from the portion of element 38 which is resonant at $2f_0$ to the entire element 41. The remainder of the structure 41 comprised of the choke or anti-resonant circuit 45, the section 41*b*, the varactor 43 and the conductor 41*a*** is itself one-quarter of a wavelength at $4f_0$ and, accordingly, is a resonant circuit at $4f_0$. In this manner, the input frequency $f_0$ is multiplied four times by the use of two strip line transmission resonant elements.

A third element 60 is shown coupled in the same manner as element 41 to a ground plane 51. Element 60 comprises section **60*a* coupled to ground plane 51, sections 60*b* and 60*c*. Coupled between sections 60*a* and 60*b* is a varactor diode 61 and coupled between sections 60*b* and 60*c* is an anti-resonant circuit or choke 62. The entire element 60 is positioned in a manner such that the portion of element 41, which is resonant at $4f_0$, mutually couples energy at $4f_0$ to the entire element 60** which acts as a one-quarter wavelength resonant element at $4f_0$.

Portions **60*a* and 60*b* of the element 60 and the varactor 61 and choke 62 in combination act as a one-quarter wavelength element at $8f_0$. In this manner a signal at eight times the frequency of the input frequency $f_0$ is obtained. An output signal is obtained from the portion of element 60 resonant at $8f_0$ by a high pass filter element 70 which couples energy from the strip line structure 34 to an output device, not shown. The cross hatched areas, shown as 40, 44 and 63, comprise a dielectric material which is used to reduce the physical dimensions required in order to provide an anti-resonant circuit or choke at the proper electrical length. Although the structure shown in FIG. 3 can be air-filled, a dielectric such as Teflon or any nonlossy material can be utilized to fill the harmonic generator 34**. In this manner the physical dimensions of the structure can be reduced.

Thus, a strip transmission line structure has been provided which is capable of generating an output signal which is an integral multiple of an input signal frequency. This cascaded structure is coupled in an interdigital fashion with adjacent elements mutually coupling energy in progressively higher frequency steps to the adjacent element which is itself resonant to a frequency at which a portion of the prior element in the chain is also resonant.

Referring now to FIG. 4, a harmonic generator or doubler 80 is shown utilizing a double shorted half wavelength resonant element which is resonant at first and second frequencies. The outside shell 81 of the doubler 80 provides the ground plane of the strip transmission line structure. Energy at a frequency $f_0$ is coupled into the structure 80 by way of a coaxial coupler 82 connected to a probe 83. The probe 83 acts as a resonant one-quarter wavelength device at the frequency of $f_0$. Energy from this one-quarter wavelength probe is then mutually coupled to a double shorted end half wavelength probe 84 which is resonant at the frequency $f_0$. The probe 84 is then utilized to couple energy into a double shorted end structure 85. The element 85 is comprised of center conductor sections **85*a*, 85*b* and 85*c* of a strip transmission line. Coupled between sections 85*a* and 85*b* is a nonlinear reactance, such as a varactor diode 86, and coupled between sections 85*b* and 85*c* is a choke or anti-resonant element 87**. The entire element from one shorted end to the other shorted end is a resonant structure at a frequency $f_0$ inasmuch as it is effectively a one-half wavelength structure at this frequency.

The lower part of the structure of element 85, comprising a portion of sections **85*b* and 85*a* including the varactor diode 86, is itself a one-half wavelength resonant structure at a frequency $f_2$ where $f_2$ is double the frequency $f_0$. The choke 87 acts as an anti-resonant circuit or high impedance at $f_2$ and, accordingly, reflects a short circuit at the portion of the choke which extends closest to the varactor diode 86. In this manner, the one-half wavelength resonant structure at the frequency $f_2$ is obtained. Energy at $f_2$ is coupled from the resonant element 85 by way of a one-half wavelength probe 88 which is shorted at both ends. Energy is then coupled from this probe 88 by a one-quarter wavelength single shorted end probe 89 which is coupled to a coaxial connector 91**. In this manner, it is possible to obtain frequency doubling utilizing shorted half wavelength resonant elements.

If it is desired, the varactor diode 86 can be D.C. biased by a feed through coaxial capacitor coupled to conductor section 85c. This feed through capacitor would have a capacitance in the order of 1,000 micromicrofarads and, accordingly, would act as a low pass filter to D.C. and a short circuit at the frequencies at which this device would be operating as a doubler. It is to be noted that it is not required that the diode be biased inasmuch as the diode itself, due to the rectifying properties of the diode, will generate a self-bias; however, if it is desired to substantially alter the D.C. point of operation of the diode, biasing can be provided to this structure in the aforementioned manner.

It is now apparent that this invention makes it possible to design harmonic generators providing odd or even multiples of an input frequency or other devices such as, for example, dividers with transmission line elements which are resonant at at least two different frequencies. It is further apparent that the open or double end shorted one-half wavelength resonant transmission line elements could be utilized in lieu of one-quarter wavelength single end shorted elements. Accordingly, it is desired that this invention not be limited except as defined by the appended claims.

What is claimed is:

1. A strip transmission line harmonic generator comprising a plurality of resonant strip transmission line elements mutually coupled in an interdigital cascaded manner with adjacent elements mutually coupling energy in progressively higher frequency steps to the adjacent element which is itself resonant to a frequency at which a portion of a prior element in the arrangement is also resonant, means for coupling an input signal to one of said strip transmission line elements, and means for coupling an output signal from another of said transmission line elements.

2. A generator in accordance with claim 1 wherein each of said transmission line elments comprises a conductor connected in combination with a lumped nonlinear reactance and a choke.

3. A generator in accordance with claim 2 wherein said conductor is a center conductor of said transmission line element and said choke is coupled to said center conductor.

4. A generator according to claim 3 wherein said nonlinear reactance comprises a varactor diode.

5. A generator in accordance with claim 1 wherein said input frequency and said output frequency signals are mutually coupled to said interdigital cascaded arrangement.

6. Apparatus comprising at least one strip transmission line element resonant at both an input and output frequency;

said element comprising a composite distributed transmission line including in series a center conductor together with a lumped nonlinear reactance and a choke, the portion of said element including the series connection of said choke and the lumped nonlinear reactance having an electrical length selected to be resonant at solely said output frequency, and the over-all element including the remainder of said conductor having an electrical length selected to be resonant at solely said input frequency;

means for coupling an input signal to said strip transmission line element;

and means for coupling an output signal from said transmission line element at a frequency equal to an integral multiple of said input frequency.

7. Apparatus according to claim 6 wherein said lumped nonlinear reactance comprises a varactor diode.

References Cited by the Examiner

UNITED STATES PATENTS

| | | | |
|---|---|---|---|
| 2,984,802 | 5/1961 | Dyer et al. | 333—73 |
| 3,076,132 | 1/1963 | Kleinman et al. | 333—24 |
| 3,085,205 | 4/1963 | Sante | 321—69 |
| 3,194,976 | 7/1965 | Ludwig et al. | 328—16 |
| 3,210,697 | 10/1965 | Comstock | 333—81 |

FOREIGN PATENTS

| | | |
|---|---|---|
| 566,244 | 11/1958 | Canada. |

JOHN F. COUCH, *Primary Examiner.*

LLOYD McCOLLUM, *Examiner.*

G. GOLDBERG, *Assistant Examiner.*